United States Patent Office 3,597,446
Patented Aug. 3, 1971

1

3,597,446
BIFUNCTIONAL PHOTOCHROMIC COMPOUNDS OF THE INDOLINO-SPIROPYRAN TYPE
Albert Lucien Poot, Kontich, Belgium, assignor to Gevaert-Agfa N.V., Mortsel, Belgium
No Drawing. Filed Sept. 11, 1969, Ser. No. 857,225
Claims priority, application Great Britain, Oct. 3, 1968, 46,947/68
Int. Cl. C07d 27/38
U.S. Cl. 260—326.11        5 Claims

ABSTRACT OF THE DISCLOSURE

Bifunctional photochromic compounds which are reversibly colored upon exposure to ultraviolet radiation having the formula:

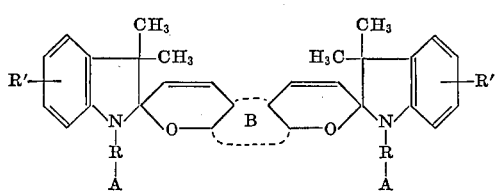

wherein:

B represents phenyl, diphenyl, diphenylmethylene, diphenylcarbonyl, diphenylsulphone, wherein the phenyl groups may be substituted by nitro, chlorine or bromine,
R represents a straight or branched chain alkylene group having 1 to 11 carbon atoms,
A represents hydrogen or hydroxyl, and
R' represents hydrogen, when A is hydroxyl or is hydroxyl when A is hydrogen, are described. These compounds being photochromic are useful in glasses, etc., and in the preparation of polymers.

---

The invention relates to new bifunctional photochromic compounds of the indolino-spiropyran type.

According to the invention bifunctional photochromic compounds of the indolino-spiropyran type are provided, which by themselves are reversibly coloured upon exposure to ultra-violet radiation, and correspond to the general formula:

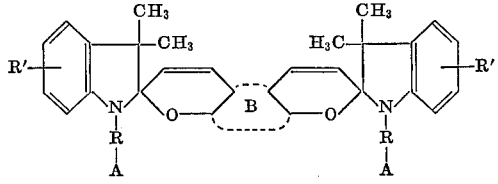

wherein:

B represents a mono- or polyaromatic system, e.g. phenyl, diphenyl, diphenylmethylene, diphenylcarbonyl, and diphenylsulphone, wherein the phenyl groups may be substituted by nitro, chlorine, or bromine,
R represents a straight or branched alkylene group of 1 to 11 carbon atoms,
A represents a hydrogen atom or a hydroxyl group, and
R' represents a hydrogen atom when A is a hydroxyl group, or represents a hydroxyl group when A is a hydrogen atom.

The bifunctional photochromic compounds of the indolino-spiropyran type of the present invention are prepared by refluxing a solution of a methylene-indoline base and an o-dihydroxydialdeyhde of an aromatic mono- or polynucleic compound, hereinafter called o-dihydroxydialdehydes, the amount of o-dihydroxydialdehyde being half

2 the stoichiometric amount of the methylene-indoline base present. In the above condensation reaction between a methylene-indoline base and an o-dihydroxydialdehyde use is made of a common solvent for both reactants, particularly alcohols, e.g., methanol. Heating up to reflux temperature highly increases the reaction speed.

Valuable methylene-indoline bases are 1,3,3-trimethyl-2-methylene-indolin-6-ol and 1-hydroxyethyl-3,3-dimethyl-2-methylene-indoline.

PREPARATION OF THE METHYLENE-INDOLINE BASES (a) Preparation of 1,3,3-trimethyl-2-methylene-indolin-6-ol 110 g. of m-methoxyphenylhydrazine, 102 g. of methyl isopropyl ketone and 1200 ccs. of ethanol were refluxed for 3 hours in the presence of 0.5 cc. of acetic acid. The reaction mixture was concentrated under reduced pressure, and the resulting hydrazone was dissolved in 600 ccs. of ethanol and 240 ccs. of a mixture of 15 g. of sulphuric acid and 85 g. of ethanol. The mixture was then refluxed for 3 more hours whilst stirring, whereupon the precipitate was sucked off. The filtrate was then poured out in approximately 4 l. of water. The pH of this solution was adjusted to 7 by adding 5 N sodium hydroxide, whereupon it was extracted with ether. Subsequently the extract was dried in the presence of sodium sulphate and concentrated by evaporation. The residue was then distilled under reduced pressure.

Yield: 113 g. of 2,3,3-trimethyl-6-methoxy-3H-indole.

113 g. of this indole, 460 ccs. of acetic acid, and 460 ccs. of hydrobromic acid (48%) were refluxed for 8 h. on an oil bath at 125–130° C. The reaction mixture was then poured out in approximately 5 l. of water and neutralized with ammonium hydroxide. The resulting precipitate was sucked off and recrystallized from water.

Yield: 27.5 g. of 2,3,3-trimethyl-3H-indolin-6-ol.

27 g. of the latter product were dissolved in 625 ccs. of boiling methanol whereupon 45 g. of methyl iodide were added. The reaction mixture was refluxed for 15 h. on an oil bath. After cooling, the precipitate was sucked off and recrystallized from ethylene glycol monomethyl ether.

Yield: 33 g. of 6-hydroxy-1,2,3,3-tetramethyl-3H-indolium iodide.

9.5 g. of this indolium iodide were dissolved in 500 ccs. of water, whereupon 30 ccs. of concentrated ammonium hydroxide were added. After stirring for 30 min. on a water bath at approximately 60° C. a greenish oil formed, which was cooled and extracted with ether. The extract was dried in the presence of sodium sulphate and the ether was evaporated.

Yield: 5.5 g. of 1,3,3-trimethyl-2-methylene-indolin-6-ol according to the following structural formula:

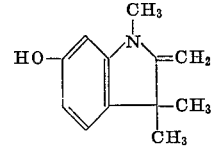

(b) Preparation of 1-(2'-hydroxyethyl)-3,3-dimethyl-2-methylene-indoline 160 g. of 2,3,3-trimethyl-3H-indole were dissolved in 1 l. of n-propanol and in the presence of 125 g. of bromoethanol refluxed for 15 hours on an oil bath at 125–130° C. After cooling the mixture was poured in 6 l. of ether. The initially sticky precipitate solidified after a few minutes, whereupon it was sucked off and recrystallized from ethanol.

Yield: 166 g. of 1-(2'-hydroxyethyl)-2,3,3-trimethyl-3H-indolium bromide melting at 194° C.

85 g. of the latter indolium bromide were dissolved in 450 ccs. of water, whereupon 150 ccs. of concentrated ammonium hydroxide were added. The reaction mixture was heated on a boiling water bath to 60° C. whereupon it was cooled and extracted with 900 ccs. of ether. The extract was dried in the presence of sodium sulphate and the ether was evaporated.

Yield: 54 g. of 1-hydroxyethyl-3,3-dimethyl-2-methylene-indoline according to the structural formula:

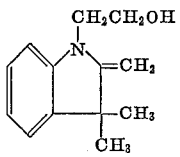

Suitable o-dihydroxydialdehydes of aromatic mono- or polynucleic compounds are:

4,6-dihydroxy-isophthalic dianhydride
2,2'-dihydroxy-5,5'-biphenyldicarboxaldehyde
5,5'-methylene-disalicylaldehyde
3,3'-dinitro-5,5'-disalicylaldehyde
5,5'-methylene-3,3'-dinitro-disalicylaldehyde

PREPARATION OF THE o-DIHYDROXY-DIALDEHYDES

The o-dihydroxydialdehydes whose phenyl group or groups are not substituted, are manufactured according to the method described in French patent specification 1,451,332. The substituted o-dihydroxy-dialdehydes are manufactured as follows:

(a) Preparation of 3,3'-dinitro-5,5'-disalicylaldehyde 3.6 g. of 2,2'-dihydroxy-5,5'-biphenyl-dicarboxaldehyde were suspended in 150 ccs. of acetic acid. Then 3,6 ccs. of fuming nitric acid ($d=1.5$) were added dropwise at room temperature within 5 to 10 min., whereby the mixture turned yellow. It was then heated on a water bath to 45–50° C. Stirring was continued for 1 h. at this same temperature. The paste got thicker and the yellow colour was intensifying.

The mixture was then cooled to room temperature. The precipitate was sucked off and washed with 25 ccs. of acetic acid.

The resulting product was recrystallized first from 300 ccs. of dichloroethane and then from 100 ccs. of dioxan. Subsequently it was dried under reduced pressure.

Yield: 3 g. of 3,3'-dinitro-5,5'-disalicylaldehyde according to the formula:

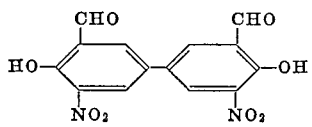

(b) Preparation of 3,3'-dinitro-5,5'-methylene-disalicylaldehyde 13 g. of methylene disalicylaldehyde were dissolved in 250 ccs. of acetic acid. To this solution 12 ccs. of fuming nitric acid were added dropwise at room temperature within 15 min. The temperature rose to 40° C. The reaction mixture was then stirred for 30 min. more, whereupon the precipitate was sucked off and recrystallized from dioxan. The product was then purified further with 250 ccs. of acetonitrile.

Yield: 6 g. of 3,3'-dinitro-5,5'-methylene-disalicylaldehyde according to the formula:

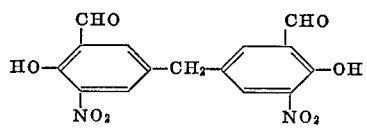

As mentioned before the methylene-indoline bases and the o-dihydroxydialdehydes are refluxed together in a common solvent to produce the bifunctional photochromic compounds of the indolino-spiropyran type of the invention. These bifunctional compounds are photochromic, i.e. they change colour or opacity when exposed to light. On exposure such compounds undergo reversible colour changes in such a way that they get coloured or change colour under the influence of light of certain wave-lengths, whereas on irradiation with other and usually longer wavelengths they show a tendency to revert to the colourless state or to the original colour. Though more slowly, the colour generally reverses even when the bifunctional compound is kept in the dark after exposure.

In order to expose the bifunctional photochromic compounds they may be dissolved or they may be applied in the form of a layer on a support, occasionally after having been dispersed in a suitable binding agent, e.g. a lacquer. They can also be dispersed in plastic substances, which are used for forming transparent objects, e.g. spectacle glasses, so that the wearer is protected against blinding by sunlight or other light.

The bifunctional compounds according to the invention can also be used for forming polymers having special properties by polycondensation with other bifunctional compounds. In the case of bifunctional compounds according to the invention containing N-hydroxy-alkyl groups, these groups are preferably converted into chloroformate groups and then converted into polycarbonates with, e.g. isophthaloyl chloride, terephthaloyl chloride, sebacoyl chloride or mixtures thereof.

The invention is illustrated by the following examples.

EXAMPLE 1

20 g. (0.1 mole) of 1-hydroxyethyl-3,3-dimethyl-2-methylene-indoline were dissolved in 150 ccs. of methanol. This solution was added to a solution of 12 g. (0.05 mole) of 2,2' - dihydroxy - 5,5' - biphenyl-dicarboxyaldehyde in 2.5 l of methanol. The mixture was refluxed for 5 hours on a water bath, concentrated in vacuo, and purified with a mixture of chloroform and naphtha in a proportion by volume of 1:10. The resulting yellow photochromic compound was bis {1'-(2"-hydroxyethyl)-3',3'-dimethyl-spiro [2H, 1-benzopyran-2,2'-indolinyl(6)]}.

Upon exposure to ultraviolet radiation the colour changed into blue.

EXAMPLE 2

The process of Example 1 was repeated with the difference, however, that 19 g. of 1,3,3-trimethyl-2-methylene-indolin-6-ol were used as methylene-indoline base. The reflux time was 2 hours and a mixture of acetone and hexane (1:10 by volume) was used as purifying agent. The yellow photochromic compound formed with bis {1',3',3'- - trimethyl - 6 - hydroxy - spiro[2H,1-benzopyran-2,2'-indolinyl(6)]}.

Upon exposure to ultraviolet radiation the colour changed into greenish blue.

EXAMPLE 3

The process of Example 1 was repeated with the difference, however, that o-dihydroxydialdehyde was replaced by 8.3 g. of 4,6-dihydroxy-isophthalaldehyde. The reflux time was 5 hours and a mixture of toluene and hexane (1:10 by volume) was used as purifying agent. The pink photochromic compound formed was 1,1"-di(2-hydroxyethyl) - 3,3,3",3" - tetramethyl-dispiro-{indolin-2,2'-(2H, 8H - benzo[1,2-b; 5,4-b']dipyran)-8',2"-indolin}.

Upon exposure the colour changed into purple.

EXAMPLE 4

When also replacing in Example 3 the methylene-indoline base by 19 g. of 1,3,3-trimethyl-2-methylene-indolin-6-ol, refluxing for 2 h. and using a mixture of acetone and hexane (1:10 by volume) as purifying agent, the colourless photochromic compound 1,3,3,1",3",3"-hexamethyl - 6,6" - dihydroxy-dispiro {indolin-2,2' (2H, 8H - benzo[1,2 - b; 5,4-b']dipyran)-8',2"-indoline} was obtained.

EXAMPLE 5

Example 1 was repeated with the difference, however, that the o-dihydroxydialdehyde was replaced by 13 g. of 5,5'-methylene-disalicylaldehyde. The reflux time was 5 hours. Purification was effected with a mixture of toluene and hexane (1:10 by volume). The colourless photochromic compound methylene-bis {1'-(2'''-hydroxyethyl)-3',3'-dimethyl-spiro[2H,1-benzopyran-2,2'-indolinyl(6)]} was formed.

Upon exposure the colour changed into blue.

EXAMPLE 6

When also replacing in Example 5 the methylene-indoline base by 19 g. of 1,3,3-trimethyl-2-methylene-indolin-6-ol, refluxing for 4 hours and using a mixture of acetone and water (1:10 by volume) as purifying agent, a yellow photochromic compound methylene-bis{1',3',3'-trimethyl - 6 - hydroxy - spiro[2H,1 - benzopyran - 2,2'-indolinyl(6)]} was formed.

EXAMPLE 7

When replacing in Example 1 the o-dihydroxydialdehyde by 16.6 g. of 3,3'-dinitro-5,5'-disalicylaldehyde, refluxing for 4 h. and using a mixture of acetone and hexane (1:10 by volume) as purifying agent, the yellow photochromic compound bis{1'-(2''-hydroxyethyl)-3',3'-dimethyl-8-nitro-spiro[2H,1-benzopyran - 2,2' - indolinyl(6)]} was formed.

Upon exposure the colour of the compound changed into green.

EXAMPLE 8

When also replacing in Example 7 the methylene-indoline base by 19 g. of 1,3,3-trimethyl-2-methylene-indolin-6-ol, refluxing for 2 hours and purifying in a mixture of dioxane and hexane (1:10 by volume), the green photochromic compound bis{1',3',3'-trimethyl-6'-hydroxy-8-nitro-spiro[2H,1 - benzopyran-2,2'-indolinyl(6)]} was formed.

Upon exposure the colour of this compound changed into blue.

EXAMPLE 9

When replacing in Example 1 the o-dihydroxydialdehyde by 17.3 g. of 5,5'-methylene-3,3'-dinitrodisalicylaldehyde, refluxing for 5 h. and purifying in a mixture of chloroform and naphtha (1:10 by volume), the yellow photochromic compound methylene-bis{1'-(2''-hydroxyethyl)-3',3'-dimethyl - 8 - nitro-spiro[2H,1-benzopyran-2,2'-indolinyl(6)]} was formed.

Upon exposure the colour of this compound changed into green.

EXAMPLE 10

When repeating Example 9 but using 19 g. of 1,3,3-trimethyl-2-methylene-indolin-6-ol as methylene-indoline base, refluxing for 4 hours and purifying in a mixture of acetone and hexane (1:10 by volume), the colourless photochromic compound methylene-bis{1',3',3'-trimethyl-6'-hydroxy-8-nitro-spiro[2H,1 - benzopyran-2,2'-indolinyl-(6)]} was formed.

We claim:

1. A bifunctional photochromic compound which is reversibly coloured upon exposure to ultraviolet radiation having the formula:

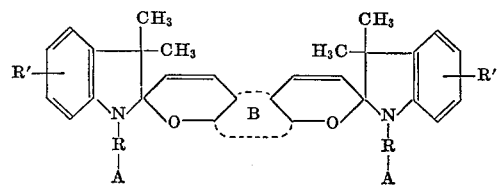

wherein:

B represents phenyl, diphenyl, and diphenylmethylene, wherein the phenyl groups may be substituted by nitro,
R represents a straight or branched chain alkylene group having 1 to 11 carbon atoms,
A represents hydrogen or hydroxyl, and
R' represents hydrogen, when A is hydroxyl or is hydroxyl when A is hydrogen.

2. Bis{1',3',3'-trimethyl-6'-hydroxy-8-nitro-spiro[2H,1-benzopyran-2,2'-indolinyl(6)]}.

3. Bis{1'-(2''-hydroxyethyl) - 3',3'' - dimethyl-8-nitro-spiro[2H,1-benzopyran-2,2'-indolinyl(6)]}.

4. Methylene-bis{1',3',3' - trimethyl - 6' - hydroxy-8-nitro-spiro[2H,1-benzopyran-2,2'-indolinyl(6)]}.

5. Methylene-bis{1'-2''-hydroxyethyl) - 3',3' - dimethyl-8-nitro-spiro[2H,1-benzopyran-2,2'-indolinyl(6)]}.

References Cited

FOREIGN PATENTS 1,451,332    7/1966    France _____ 260—326.11

NICHOLAS S. RIZZO, Primary Examiner

J. A. NARCAVAGE, Assistant Examiner

U.S. Cl. X.R.

117—34; 252—300; 260—600